United States Patent [19]

Yu

[11] Patent Number: 5,273,788

[45] Date of Patent: Dec. 28, 1993

[54] PREPARATION OF DIAMOND AND DIAMOND-LIKE THIN FILMS

[75] Inventor: Bing-Kun Yu, Salt Lake City, Utah

[73] Assignee: The University of Utah, Salt Lake City, Utah

[21] Appl. No.: 916,384

[22] Filed: Jul. 20, 1992

[51] Int. Cl.⁵ .............................. B05D 3/06; B01J 3/06
[52] U.S. Cl. ..................... 427/554; 427/581; 427/596; 423/446
[58] Field of Search ............... 427/512, 554, 555, 556, 427/581, 596, 597; 423/446

[56] References Cited

U.S. PATENT DOCUMENTS

| | | | |
|---|---|---|---|
| 4,830,874 | 5/1989 | Kawabata et al. | 427/547 |
| 4,916,115 | 4/1990 | Mantese et el. | 505/1 |
| 4,933,221 | 6/1990 | Nishimura et al. | 427/434.3 |
| 4,948,629 | 8/1990 | Hacker et al. | 427/53.1 |
| 4,954,365 | 9/1990 | Neifeld | 427/53.1 |
| 4,981,984 | 1/1991 | Davies et al. | 427/434.3 |
| 4,996,075 | 2/1991 | Ogawa et al. | 427/12 |
| 4,997,809 | 3/1991 | Gupta | 505/1 |
| 5,057,335 | 10/1991 | Hanagata et al. | 427/53.1 |
| 5,066,515 | 11/1991 | Ohsawa | 427/53.1 |
| 5,075,094 | 12/1991 | Morrish et al. | 423/446 |
| 5,093,154 | 3/1992 | Hatada et al. | 427/43.1 |
| 5,130,162 | 7/1992 | Ogawa et al. | 427/515 |
| 5,132,105 | 7/1992 | Remo | 427/577 |
| 5,209,916 | 5/1993 | Gruen | 423/446 |

FOREIGN PATENT DOCUMENTS 093867  10/1986  Japan .

Primary Examiner—Marianne Padgett
Attorney, Agent, or Firm—James L. Sountag

[57] ABSTRACT

A layer of a hydrocarbon molecule is applied to a substrate by the Langmuir-Blodgett technique, and the surface is irradiated with a laser to decompose the layer of molecules at the surface without influencing the substrate. After decomposition the carbon atoms rearrange on the surface of the substrate to form a DLC film. The method of the invention may also be used to form other film, using a suitable molecule to produce the LB layer before irradiation.

13 Claims, No Drawings

PREPARATION OF DIAMOND AND DIAMOND-LIKE THIN FILMS

FIELD OF THE INVENTION

The present invention relates to the formation of diamond and diamondlike films.

BACKGROUND OF THE INVENTION

A method in the prior-art for forming diamond and diamondlike films is by chemical vapor deposition (CVD). Generally in this method, a gas stream containing a carbon-containing gas and hydrogen is passed over a heating element, such as a hot filament, which decomposes the carbon-containing gas. The heated gas stream is passed over a substrate heated to a temperature lower than the heating element, and carbon from the gas is deposited upon a substrate. Depending upon the composition of the gas stream and the process conditions, a diamond film or a diamondlike film may be formed on the substrate. A diamond film is a film consisting essentially of carbon in a diamond phase with fourfold coordination ($sp^3$). A diamondlike carbon (DLC) film is a film with mixed carbon phases, mostly diamond phase mixed with a three fold coordination graphite phase ($sp^2$), as well as polymeric carbon phases. Because of their unique properties, i.e., optical transparency over a wide spectral range, good electrical insulation, chemical inertness and extreme hardness, diamond and DLC films have attracted considerable interest. Possible applications for these films include anti-reflection coatings for infrared optics and silicon solar cells, and coatings to reduce wear and corrosion.

An example of a CVD process for forming diamond and DLC films is disclosed in U.S. Pat. No. 5,075,094 to Morrish et al. In this process hydrogen and methane at 45 torr were passed over a the heating element is a filament or an arc at a temperature above 1600° C. After heating the gas, the gas was passed over a substrate that was heated to a temperature between 500° C. and 1300° C. The improvement of the Morrish et al. process involved treating the surface of the substrate with oil before the CVD process.

A problem with CVD processes is that they require expensive equipment, e.g. vacuum chambers, gas flow control systems, high temperature heating systems and controls. In addition, the process requires that the substrate be heated, which precludes the use of substrates which decompose or are altered by heating in the CVD process. For example, many tempered or hardened steel alloys will loose their temper at substrate temperatures in CVD processes.

Diamond films have been formed by immersing a substrate in a fluid medium comprising a carbon-containing precursor and irradiating the substrate with a laser to pyrolyze the precursor. For example, in U.S. Pat. No. 4,948,629 to Hacker et al. is disclosed a process for the deposition of diamond films where gas containing an aliphatic acid or an aromatic carboxylic anhydride that vaporizes without decomposition is passed over a substrate and irradiated with a focused high-powered, pulsed laser. Also in U.S. Pat. No. 4,954,365 to Neifeld is disclosed a process where the substrate is immersed in a liquid containing carbon and hydrogen, e.g. methanol. A laser pulse is then directed through the liquid coating to heat the substrate. The liquid is pyrolyzed and carbon material from the pyrolyzed liquid grows on the substrate to form a diamond coating on the substrate.

Other examples of the use of a laser to form a diamond films is disclosed in Japanese Patent 63-093,867 (as disclosed in Derwent Abstract 88-152150/22), which describes formation of amorphous diamond thin films by irradiating a non-converging laser beam onto a substrate.

It is also known to coat a precursor upon a substrate and pyrolize the precursor to form a final film. For example, in U.S. Pat. No. 4,916,115 to Mantese et al. a process is disclosed for forming patterned thin film superconductors. The process comprises coating a substrate with solution of a metal oxide precursor and a light absorbing dye. A focused laser light is then scanned across the surface to locally pyrolyze the precursor to the metal oxide.

Layers of molecules applied on a substrate by the Langmuir-Blodgett technique are known in the art for numerous applications, such as disclosed in U.S. Pat. Nos. 5,093,154 to Hatada et al., and 4,996,075 to Ogawa et al. Treatment of LB layers to more firmly adhere the layer to the substrate or modify the surface of the LB layer is known. The teaching of the prior-art is to preserve the essential chemical character of the film, and the prior-art methods are directed at modifying or enhancing the film properties. However, pyrolyzing a LB layer as a precursor to a completely reformed film, as in the present invention is not known.

OBJECTS OF THE INVENTION

It is, therefore, an object of the invention to provide a method for the formation of diamond and DLC films.

It is also an object of the invention to provide a method for the formation of diamond and DLC films where the composition of the film can be controlled.

It is also an object of the invention to provide a method for the formation of diamond and DLC films which is relatively inexpensive and simple.

It is also an object of the invention to provide a method for forming various films, e.g. metallic, semiconductor and superconductor, using certain precursor molecules and conditions.

Further objects of the invention will become evident in the description below.

SUMMARY OF THE INVENTION

An embodiment of the invention is a method for applying DLC carbon film on a substrate comprising;
(a) depositing a Langmuir-Blodgett molecular layer of a molecule containing carbon and hydrogen on a substrate surface, and
(b) irradiating the molecular layer with a laser beam sufficient to reform bonds between carbon atoms in the molecular layer so as to form a DLC film on the substrate.

By "diamondlike carbon" or "DLC" film, as used in the description and the claims, is meant carbon film which contains one or more phases of elemental carbon. Phases which may be present are graphite as single crystals, graphite as microcrystals, diamond single crystals, diamond as microcrystals, amorphous phases which may contain diamond and/or graphite structures, and any crystalline or non-crystalline form of elemental carbon. The preferred films are films containing diamond phase, either as single crystals or microcrystals, usually mixed with a graphite phase.

It is also contemplated that films can be made that contain buckminsterfullerenes, e.g. $C_{60}$, from hydrocarbon precursors, such as those used to form DLC films.

The nature of the films can be controlled by the processing conditions (wavelength and power of the laser), the number of monolayers of the Langmuir-Blodgett (LB) layer, and the nature of the molecule of the constructing LB organic compound. The irradiation of the laser produces a controlled bond breakage of the organic molecules in the monolayer which results in a minimal rearrangement of the carbon atoms and a reformation of the bonds. As the bonds with the carbon atoms are broken, new bonds are formed with adjacent carbon atoms. Accordingly, the arrangement of the carbon atoms of the layer on the substrate, as determined by the structure of the monolayer molecules and the number of monolayers, determines to a large degree the structure of DLC film. The DLC films of the invention may contain minor amounts of other elements or substances that do not interfere with the formation or function of the DLC film, e.g., oxygen from air that is bonded to the carbon during irradiation.

An essential feature is that the precursor of the DLC films of the invention be in the form a layer of molecules as applied by the Langmuir-Blodgett technique. The Langmuir-Blodgett Technique for applying molecular monolayers is known in the art and is described in *Langmuir-Blodgett Films*, edited by Gareth Roberts, Pleneum Press. New York and London, 1990. The Langmuir-Blodgett (LB) technique involves forming one or more molecule layers in an ordered array consisting of surfactant-type organic molecules with a hydrophilic polar head group and a hydrophobic tail. The organic molecules are dissolved in an organic solvent, the solution is spread on a water surface, and the organic molecules are gathered into a monolayer after evaporation of the solvent. The gathering of the molecules into a dense, solid thin film is by means of a barrier giving a surface pressure. At this point, the substrate is moved through the monolayer, transferring the monolayer to the substrate. This creates a thin, dense, solid, organic molecular film with the molecules standing on end and closely compacted together on the surface. This process is repeated, if desired, to build up a plurality of monolayers on the substrate to form a LB layer with any desired number of monolayers. Thus, there may be one monolayer of molecules or any number of multiple monolayers, such as, but not limited to one layer, two layers, three layers, six layers, above ten layers, about a hundred layers, and several hundred layers.

The LB layer is characterized as having a high density of carbon atoms and hydrogen atoms necessary for formation DLC films, particularly for DLC films with a substantial portion of diamond phase. The carbon atoms are necessary to form the final DLC lattice network, after reformation of the carbon atom bonds. Without being bound to any theory, it is believed that the hydrogen atoms are required in the reformation of the bonds to form DLC films containing a diamond phase. Thus, for the LB layer, hydrocarbon molecules rich in hydrogen are believed to form films with a higher proportion of carbon four-fold diamond coordination. It is believed that the formation of C-H bonds on a diamond-phase surface prevents graphitization from being initiated on the diamond-phase surface.

In contrast to the high-density LB layer precursor of the present invention, for processes where a precursor is coated a substrate by methods such as merely dipping in or painting on a precursor, or the substrate is submersed in a liquid or gaseous precursor fluid, it is more difficult to form DLC films because the density of carbon atoms is not as high. In addition, in the method of the present invention the carbon atoms in precursor LB layer are located close enough proximity and spatially located relative to each other to more easily reform bonds during laser irradiation that are DLC, particularly diamond, in character. Thus, the composition of the DLC film is determined to a large degree by the organic molecule in the LB layer, which permits a greater degree of control over the DLC film formation than prior-art methods.

Suitable substrates include any substrate material capable of having an adsorbed LB layer of an organic molecule on its surface. Suitable substrate materials may include, but are not limited to, metals and metal alloys, such as steel, aluminum and aluminum alloys; silicon oxide glass or crystalline materials, such as glass or quartz; various semiconducting materials, such as Si and GaAs; metal oxides; and organic polymers, such as Teflon TM and Mylar TM, and the like. An advantage of the present invention, is that films can be applied to any substrate capable of supporting a monolayer of organic molecules. During irradiation of the monolayer by the laser, only enough energy is required to form a DLC film, and the substrate is heated to a negligible degree. Thus, it is possible to applied DLC coatings on substrates that would be thermally degraded or altered by heat, such as tempered and hardened steel alloys.

Suitable organic molecules for forming the DLC films of the invention are organic molecules of the surfactant type, i.e., with a hydrophilic head group and a hydrophobic tail group. Preferably the molecule is rich in carbon and hydrogen and has a high molecular weight. Preferred organic molecules are aliphatic, but any cyclic, aromatic, saturated or unsaturated molecule is suitable that can be adsorbed on a substrate surface as a molecule monolayer. In general, DLC films with a higher proportion of diamond phase is achieved with molecules having long aliphatic chains. The long aliphatic chains form compact LB films on the substrate, and are rich in carbon and hydrogen, which is preferred for the formation of DLC films. Suitable organic molecules are those used in the examples below, particularly oleic acid, as used in Example I.

To prepare the DLC films of the invention, a laser was chosen to irradiate and carbonize the LB layer. Laser irradiation only affects the surface and decomposes the organic molecules in the LB layer, but has little or no effect on the substrate. After decomposition, the carbon atoms automatically rearrange on the substrate surface and form DLC films. This contrasts with CVD methods, where heating or bulk annealing of the substrate is required, and DLC film is formed by precursors in a gas phase condensing on the substrate. Thus, in the present method, the composition of the DLC film can be controlled to a greater degree by the composition of the LB precursor layer, and a substrate may be chosen that would otherwise by damaged, or changed by heating required in CVD methods.

The laser power and time of irradiation is chosen to induce rebonding of the carbon atoms in the LB layer and achieve formation of the DLC film. The laser power and length of irradiation can be used to achieve the desired proportion between diamond and graphite phases in the film. As illustrated below in the example, the proportion of graphite may be increased by adjusting the length time of irradiation of the laser. The exact time of irradiation and laser power depends on the type of laser, particularly whether a pulsed or continuous wave laser is used, the particularly organic molecule in the LB layer, and the number of monolayers in the LB layer. The exact irradiation duration and laser power can be determined by routine experimentation for any particular application.

Any suitable laser beam source may be used, including any of various gas or solid state lasers, or the continuous wave or pulse type. The purpose of the laser beam in to affect the carbon atom rearrangement as previously described, and it is understood that any other energy beam sources that function the same are contemplated in the present invention. These may include, but are not limited to electron beam, x-ray, and the like.

In its broadest embodiment, the method of the invention may also be applied to formation of other films, such as semiconducting or metallic films by selection of an appropriate molecule, such as metal chelates, for formation of the LB layer applied to the substrate. In this embodiment the molecule of the LB layer contains the precursor element or elements necessary to reform under irradiation to the desired film.

Potential applications for the films of the invention include used in opto-electronic, high temperature electronics, silicon solar cell, infrared detector, and missile and spacecraft applications. The films are suitable where coatings are required that have abrasion, corrosion, and wear resistance for use in cutting tools, magnetic disks, processing equipment, low friction coatings, and the like.

The present invention permits the formation of DLC films with a relatively simple apparatus. No vacuum chambers, gas flow systems, heating systems for the substrate, at the like are required. The method for forming a dense layer of molecules with the LB method is relatively inexpensive, and provides DLC films with similar properties as the prior-art. In addition, the practitioner can has more control over the properties of the film by choosing the nature of LB layer, and by controlling the conditions of irradiation.

DETAILED DESCRIPTION OF THE INVENTION

In the examples below, three different compounds were used as organic molecules, representing high molecular weight molecules which are rich in carbon and hydrogen. Each had a hydrophilic head and a hydrophobic tail. The chemicals were treated very carefully for purity in order to form homogenous adsorbed layers on the substrate. The compounds were as follows;

(1) Oleic acid $CH_3(CH_2)_7CH=CH(CH_2)_7COOH$ (2) Stearic acid cumarin

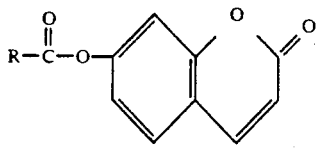

where R is $-CH_2(CH_2)_{15}CH_3$ (3) Oleoyl vanillin

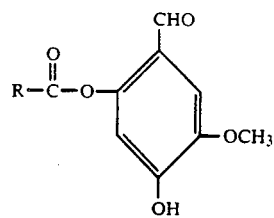

where R is $CH_2(CH_2)_6CH=CH(CH_2)_7CH_3$

Each of the three organic molecules were used to form a single LB monolayer on a substrate.

The apparatus used for preparation of the LB monolayer was a Mayer circular trough equipped with an electronically controlled dipping device and a Withelmy film balance. The LB films were prepared at room temperature. A $5 \times 10^{-4}$M solution of a sample organic molecule in chloroform was dripped onto a purified aqueous subphase of deionized, secondary distilled water. After the molecules spread on the water surface, the surface was pressurized according to conventional LB technique to reduce the film area of sample molecules. When the pressure reached 17 mN/m, the molecules on the film arrayed themselves homogeneously and densely to form a thin solid organic molecular film. The film was then transferred at 5 mm/min to a substrate plate. A single LB monolayer on the substrate was thus obtained. By repeating the procedure, multiple LB monolayers could be applied to the substrate. The deposition of the LB film was of one monolayer of the Z-type with the hydrophilic head positioned toward the substrate and the hydrophobic tails extending away from the substrate. Any number of additional monolayers may be applied, and depending upon the molecule and the substrate, X-type deposition with hydrophobic tails extending toward the substrate and the hydrophilic head extending away from the substrate, or Y-type deposition with multiple monolayers alternating between the hydrophobic heads extending toward and away from the substrate, are contemplated.

The substrate plate was a glass plate. As further discussed below, the glass plate was coated with silver for Raman scatter measurements.

An argon laser operating at 4880 Å was focused on the sample both as the carbonizing laser irradiation source and as an excitation source for Raman scattering. Raman scattering analysis was performed as the DLC film formed on the surface of the LB monolayer. Measurements were performed while continuously increasing laser power.

In the examples, only one monolayer LB films were made. To observe the formation and structural changes in the DLC films, surface enhanced Raman scattering (SERS) was used. SERS is a known technique that can distinguish not only diamond structure and graphite structure in the film, but also can characterize amorphous and microcrystalline structure, thereby revealing the variety and complexity of structure in the DLC films. The enhancement of the Raman signal by SERS is typically of $10^5$ to $10^6$.

The SERS measurements were made by depositing a layer of silver on the substrate by chemical deposition (200 Å to 300 Å) before forming the LB layer. A measurement of the absorption spectrum of the silver revealed that was a prominent peak at 440 nm, which is consistent with a plasmon resonance absorption of the silver surface. When the incident light field excites surface plasmon resonance or is near a resonance, the local field at the silver surface increases greatly and induces SERS in the DLC film.

The instrument used for spectra measurments was a SPEX 1403 Raman spectrometer. The Raman measurements were preformed on the sample with excitation with the above 4880 Å argon laser. The glass slide coated with silver and the LB monolayer was placed on the sample holder. The incident angle was 55° and the right angle geometry was used for collecting the scattering light.

Unless otherwise indicated, each sample was irradiated by gradually increasing the laser power to about 700 mW and scanning the Raman spectra in the sensitive range for DLC films (about 1000 to about 2000 $cm^{-1}$). The SERS of DLC films was observed continuously. As the laser power increased, the LB film molecules carbonized. The carbon atoms rearranged and formed DLC films that showed diamond-like SERS peaks.

EXAMPLE I

A monolayer of Oleic acid was adsorbed upon a substrate of silver coated glass, and the monolayer was irradiated with a laser, as described above. In the SERS spectra, beginning at about 100 mW there were sharp peaks at 1332 $cm^{-1}$ and 1580 $cm^{-1}$, both of which are known as typical DLC film Raman peaks. 1332 $cm^{-1}$ is representative of the diamond crystal (with fourfold coordination symmetry), and 1580 $cm^{-1}$ (G line) is representative of large single crystal graphite (with threefold coordination symmetry).

In general, the optical properties of diamond and graphite are very different, and will affect Raman scattering. The absolute Raman cross sections of diamond and graphite have been measured and it was found that the 1580 $cm^{-1}$ band of graphite is 50 times stronger than the 1332 $cm^{-1}$ band of diamond. Comparing the intensity of the two peaks in the spectra the DLC film indicated that there is a greater percentage of diamond structure. The carbon atoms were shown to have a long-range order.

For the DLC of this example, as the laser power was increased, the width of the 1580 $cm^{-1}$ peak at half-height (FWHM) apparently increased. When the incident laser power reached 700 mW, the 1332 $cm^{-1}$ peak decreased, suggesting that the diamond structure in the DLC film had decomposed. At the same time, a new peak at 1532 $cm^{-}$ appear, which can be explained by reference to bond-angle disorder of the graphic structure. The 1332 $cm^{-1}$ intensity decrease and the appearance of the new 1532 $cm^{-1}$ peak indicated that carbon atoms in the DLC film were turning from long-range order to short-range order, i.e., from fourfold coordinated (sp$^3$) to threefold coordinated (sp$^2$).

EXAMPLE II

For comparison a DLC film was formed as in Example I, except the organic molecule was stearic acid cumarin. The monolayer was studied under high power irradiation. At 600 mW were observed two strong peaks located at 1360 $cm^{-1}$ and 1596 $cm^{-1}$. These correspond to shifts of the 1355 $cm^{-1}$ (D Line) which represent small graphite crystallites and the 1580 $cm^{-1}$ (G Line), which represents singe crystal graphite. Here amorphous or a disordered mode graphitic microcrystals are the main components in the films. The structure of the film is more disordered.

For the same sample, starting at a low laser power of about 150 mW, the Raman spectra showed lines at 1350 $cm^{-1}$ (D Line), 1580 $cm^{-1}$ (G Line) and 1530 $cm^{-1}$. The D line and the G line indicated the presence of graphite crystallites and single crystal graphite. The line at 1530 $cm^{-1}$ represents bond-angle disorder. When the laser power was increased up to 1000 mw, the D Line did not change, but the 1530 $cm^{-1}$ line disappeared. The intensity ratio of the intensity of the D Line to the intensity of the G Line, I(D)/I(G), apparently decreased and the line width of the G Line narrowed. All of this indicated that substantial structural changed occurred. The direction of the change suggests crystallites still existed but the crystallites begin to grow, long-range translational symmetry increased and crystal momentum conservation began to increase.

EXAMPLE III

A monolayer of oleoyl vanillin was adsorbed upon a silver coated substrate and irradiated with a laser as in Examples I and II, and the Raman spectra observed. At 400 mW, there were peaks at frequencies 1338 $cm^{-1}$, and 1588 $cm^{-1}$. This indicated that there was diamond structure (sp$^3$) and graphite structure (sp$^2$), but compared with the standard peak positions at 1332 $cm^{-1}$ and 1580 $cm^{-1}$ both peaks were shifted to high frequency. This is caused by the production of strain under laser irradiation in the film surface. As the laser power increased, the peak at 1338 $cm^{-1}$ shifted to 1410 $cm^{-1}$ and broadened, which suggests that the sp$^3$ structure decomposed and changed to the graphite structure.

A further discussion or formation of DLC films of the invention is found in the article "New Preparations and properties of Diamondlike Films", by Bing Kun Yu and Xao Min Chen, published in Proceedings of the SPIE-The International Society for Optical Engineering, Diamond Optics IV, Jul. 22 to 23, 1991, San Diego, Calif., While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A method for applying diamondlike carbon (DLC) film on a substrate comprising;
    (a) depositing a Langmuir-Blodgett molecular layer of a molecule containing carbon and hydrogen on a substrate surface, and
    (b) irradiating the molecular layer with a laser beam sufficient to reform bonds between carbon atoms in the molecular layer so as to form a DLC film on the substrate.

2. The method of claim 1 wherein the molecule contains a chain with at least seven adjacent —CH$_2$— groups.

3. The method of claim 1 wherein the molecule is chosen from the group consisting of oleic acid, stearic acid cumarin, and oleoyl vanillin.

4. The method of claim 1 wherein the molecule is oleic acid.

5. The method of claim 1 wherein the substrate is chosen form the group consisting of metals, metal alloys, silicon oxide, semiconductors, metal oxides, and organic polymers.

6. The method of claim 1 wherein the substrate is chosen form the group consisting of steel, aluminum, aluminum alloys, glass, quartz, Si and GaAs.

7. The method of claim 1 wherein the Langmuir-Blodgett layer consists of one monolayer.

8. The method of claim 1 wherein the Langmuir-Blodgett layer consists of a plurality of monolayers.

9. The method of claim 1 wherein the laser beam is produced by an argon laser.

10. The method of claim 1 wherein the laser beam is produced by a pulsed laser.

11. The method of claim 1 wherein the molecule contains a chain with at least 18 adjacent carbon atoms.

12. The method of claim 1 wherein the DLC film contains at least one buckminsterfullerene compound.

13. A method for producing a film on a substrate comprising;
  (a) depositing on a substrate surface a Langmuir-Blodgett molecular layer of a molecule containing a precursor for the film, and
  (b) irradiating the molecular layer with a laser beam sufficient to reform bonds between the precursor atoms in the molecular layer so as to form a film on the substrate containing at least one buckminsterfullerene compound.

* * * * *